(12) United States Patent
Schwarzbich

(10) Patent No.: US 6,296,396 B1
(45) Date of Patent: Oct. 2, 2001

(54) STRUT BEARING

(76) Inventor: Jörg Schwarzbich, Wertherstr. 15, D-33615 Bielefeld (DE)

(*) Notice: Subject to any disclaimer, the term of this patent is extended or adjusted under 35 U.S.C. 154(b) by 0 days.

(21) Appl. No.: 09/438,323
(22) Filed: Nov. 12, 1999

(30) Foreign Application Priority Data

Nov. 12, 1998 (EP) .................................................. 98121601

(51) Int. Cl.⁷ .................................................. F16C 33/78
(52) U.S. Cl. .......................... 384/607; 384/480; 384/482; 384/484
(58) Field of Search ..................... 384/477, 480, 384/482, 484, 485, 486, 607

(56) References Cited

U.S. PATENT DOCUMENTS 4,274,655   6/1981  Lederman.

FOREIGN PATENT DOCUMENTS

| 23 29 910 | 1/1975 | (DE). |
| 26 58 748 | 6/1978 | (DE). |
| 42 27 474 | 2/1994 | (DE). |
| 42 29 199 | 3/1994 | (DE). |
| 0 390 331 | 10/1990 | (EP). |
| 2 145 781 | 4/1985 | (GB). |

Primary Examiner—Lenard A. Footland
(74) Attorney, Agent, or Firm—Burns, Doane, Swecker & Mathis, LLP

(57) ABSTRACT

A strut bearing includes two bearing races, a space formed between these two races, roll bodies arranged in the space between the two races, and a seal for sealing the space formed between the two races. At least a part of the seal is made of an elastic material, and the seal is molded to the bearing races or to parts of a casing accommodating the bearing races.

9 Claims, 3 Drawing Sheets

STRUT BEARING

BACKGROUND OF THE INVENTION

The invention relates to a strut bearing comprising two bearing races, roll bodies arranged between these races, and a seal which seals the space between said two races.

Strut bearings of this type serve for supporting strut-type wheel suspensions for the steerable wheels of automotive vehicles on the vehicle body. The strut-type suspension is essentially formed by a shock absorber and a helical spring surrounding the same. The head of the shock absorber is connected to the vehicle body and is surrounded by the strut bearing. The casing of the strut bearing must, accordingly, have a relatively large internal diameter. A member rigidly connected to the vehicle body is supported on the upper race of the bearing, whereas the lower race is supported on a spring collar which forms an engagement surface for the upper end of the helical spring. Thus, the bearing must be capable of absorbing a high axial load which corresponds to the portion of the weight of the vehicle acting upon the associated wheel. In addition, the bearing is subject to relatively high radial forces, because the strut is normally inclined relative to the vertical.

Known strut bearings of this type comprise a casing formed by two annular casing halves made of synthetic resin and snap-fastened to one another, which accommodate the races of the bearing and on which the seal is formed. In view of the relatively high load, a comparatively hard synthetic resin material must be used for the casing. The seal is formed by sealing lips formed integrally with the casing halves or by labyrinth profiles and has the purpose to protect the races and roll bodies accommodated in the casing against mud and water.

When the vehicle wheel is steered, the bearing is expected to allow for a smooth rotation of the strut about its longitudinal axis.

In conventional strut bearings, it may however happen during a steering operation that the bearing becomes locked, so that the rotation of the spring collar is stopped and the helical disk is subject to a torsional force. When the torsional force exceeds the locking force of the spring collar, the spring collar makes an abrupt rotation, and the torsional bias of the helical spring is released, until the bearing locks again. This effect which is also termed "spring jumping" is perceptible to the driver as a slight vibration and a disturbing noise during the steering operation.

It is an object of the invention to provide a strut bearing which can avoid the phenomenon of spring jumping.

SUMMARY OF THE INVENTION

According to the invention, this object is achieved by providing a strut bearing comprising two bearing races, a space formed between the two races, roll bodies arranged in the space between the two races, and a seal which seals the space between the two races, wherein said seal comprises an elastic, soft material molded to the races or to parts of a casing accommodating the races.

This solution is based on an analysis which has shown that, in conventional strut bearings, the phenomenon of spring jumping is mainly due to the fact that the sealing lips or labyrinth profiles of the seal are made of the same hard synthetic resin material as the rest of the casing halves. Due to the above-mentioned radial forces and the lacking resiliency of the seal, the frictional forces occurring on the sealing surfaces which come into engagement with each other may become so large that they resist a rotation of the casing halves relative to one another and lead to a stick-slip effect which, as the case may be, is still enhanced by resonances of the helical spring and causes the above-mentioned vibration and noise. According to the invention, the use of a softer material for the seal or at least for parts of the seal leads to a higher resiliency, so that this effect is largely suppressed. On the other hand, since the seal is still directly molded to the main part of the casing half, it is still possible to manufacture the casing halves as one-piece bodies, and it is still possible to employ compact sealing structures in view of the restrained mounting space.

In the manufacturing process, the casing half of the bearing can be molded from synthetic resin in two steps. In this case, the main body of the casing half is molded in a first step from a hard resin material, and subsequently the seal is molded in a second step from a softer material. Alternatively, a two-component molding process can be employed in which the harder main body of the casing half and the softer seal are molded in one operation.

In a modified embodiment of the invention it is also possible to dispense with one or both of the casing halves and to mold the seal structures directly to the bearing races.

In general, it is sufficient when the sealing lip which effectively closes the sealing gap is connected to the main body of the casing half or to the bearing race by a bridge portion made of said softer material, so that the required resiliency of the seal is achieved. The sealing lip itself could be made of a harder material. In a preferred embodiment, however, the seal or, more precisely, the sealing lip is in its entirety made of a soft material, e.g. soft synthetic resin or rubber having a friction coefficient as small as possible.

If the seal is structured as a labyrinth, then there is normally no frictional engagement between surfaces of the sealing structures. The feature according to the invention becomes effective when the radial forces lead to a deformation of at least one of the two casing halves and/or to a shift of the casing halves or the bearing races relative to one another, with the result that surfaces of the sealing structures come into frictional engagement with one another. In a preferred embodiment, however, the seal is formed by a sealing lip, and this sealing lip is constantly engaged with an associated counter surface of the other casing half or the other race of the bearing.

As in conventional strut bearings, the seal in the strut bearing according to the invention may also be configured such that it can be used for snap fastening the two casing halves together, so that the bearing can conveniently be handled as a single unit until it is built into the vehicle.

BRIEF DESCRIPTION OF THE DRAWINGS

Preferred embodiments of the invention will now be explained in conjunction with the accompanying drawings, in which.

DETAILED DESCRIPTION OF PREFERRED EMBODIMENT OF THE INVENTION

Figure 1:
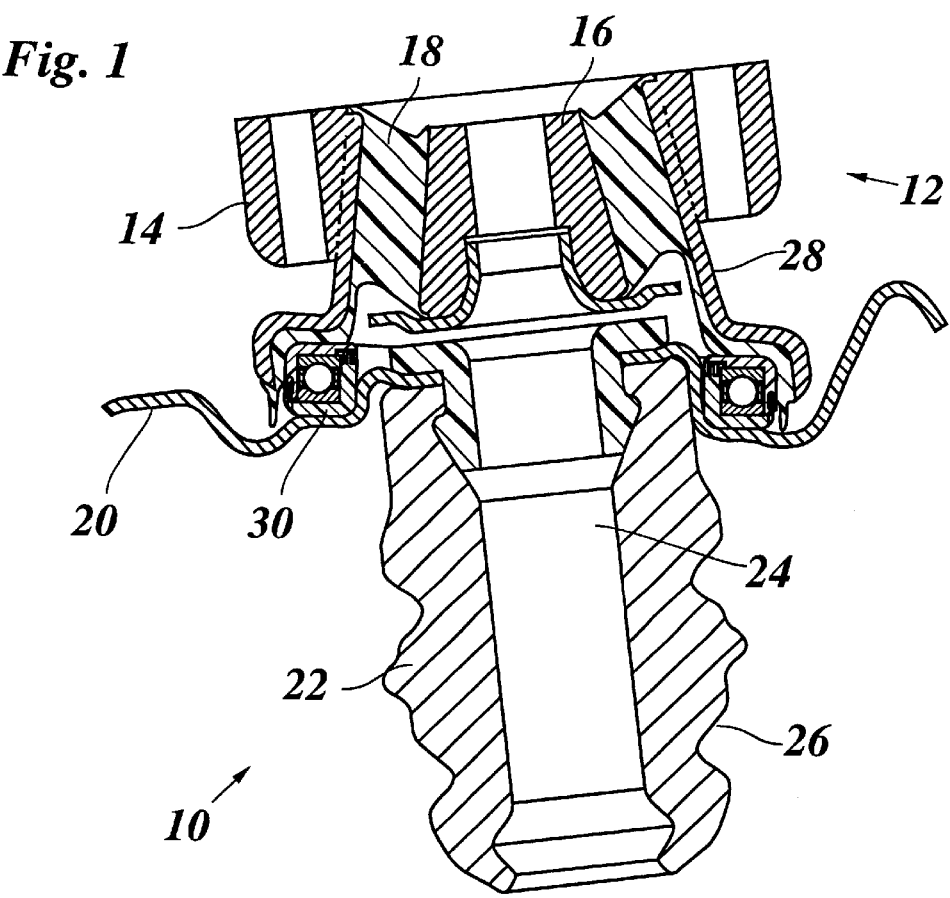
FIG. 1 is a sectional view of the top end of a strut-type vehicle wheel suspension comprising a strut bearing according to the invention.

FIG. 1 shows parts of a top end of a strut-type wheel suspension 10 which is mounted to a damper 12 which itself is fixed at the vehicle body. The wheel suspension is mounted in a slightly inclined position and rotatable about its longitudinal axis. The damper 12 has an outer ring 14 and an inner ring 16 made of metal, and an annular rubber bushing 18 interposed therebetween. Of the strut-type wheel suspension 10, FIG. 1 shows only an upper spring collar 20 and a head member 22 which forms a guide sleeve 24 for a piston rod of a shock absorber (not shown). A fastening profile 26 for a rubber sleeve is provided at the outer circumferential surface of the head member 22. The spring collar 20 serves to support the top end of a helical spring (not shown) which surrounds the shock absorber and elastically bears the weight of the vehicle body.

The top end of the piston rod of the above-mentioned shock absorber is adapted to be secured to the inner ring 16 of the damper 12 in a fixed axial position. The outer ring 14 of the damper forms a dish-shaped seat 28 for a strut bearing 30. The seat 28 is lined with parts of the rubber bushing 18.

Figure 2:
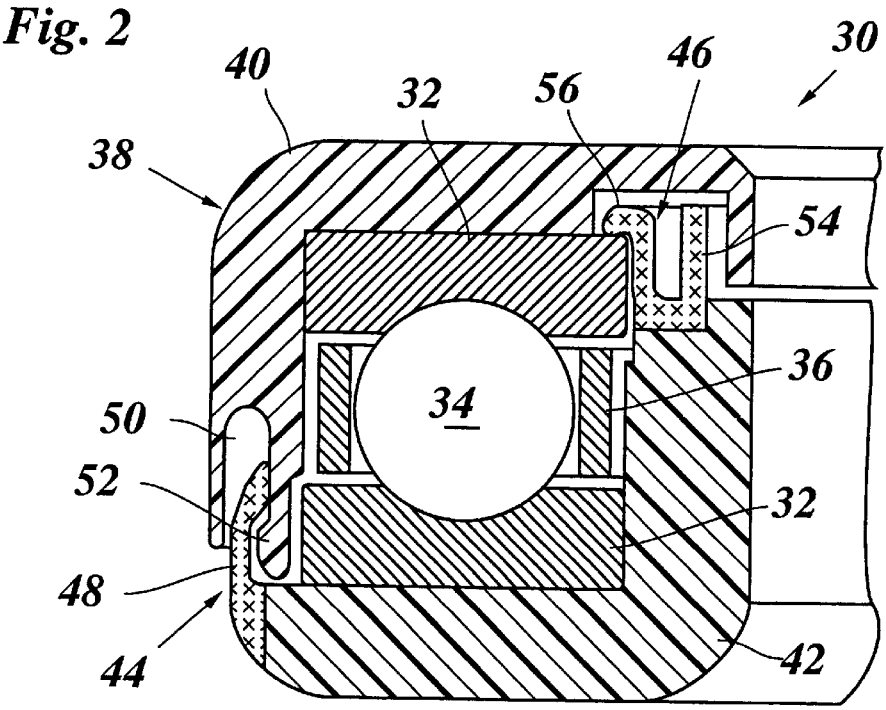
FIG. 2 is an enlarged cross section of the strut bearing.

The strut bearing 30, a cross section of which is shown in an enlarged scale in FIG. 2 as the form of a ring with a comparatively large internal diameter surrounding parts of the spring collar 20 and the head member 22. In the shown embodiment the strut bearing 30 is an axial roll bearing having upper and lower races 32 made of steel and a cage 36 accommodating bearing rolls 34. The races 32 and the cage 36 are mounted in an annular casing 38 which is composed of two annular casing halves 40, 42. The casing halves 40, 42 each have an essentially L-shaped profile and are made by injection molding from a comparatively hard synthetic resin which is capable of bearing a high weight load. The weight of the vehicle is supported by the upper race 32 via the seat 28 and the upper casing half 40, whereas the lower race 32 is supported on the helical spring (not shown) via the lower casing half 42 and the spring collar 20.

The two halves 40, 42 of the casing 38 are provided with seals 44, 46 at both their external and internal circumferential edges. Before the strut bearing is mounted, these seals serve for mechanically holding the two halves of the casing together. After the casing has been mounted, they have the main function to protect the internal space of the casing, in which the races 32 and the roll cage 36 are accommodated, against mud and water and to prevent lubricant from leaking out of the bearing.

An outer circumferential edge of the seal 44 is formed by a sealing lip 48 molded to the casing half 42 and made of rubber, or a suitable synthetic elastic resin material, which is significantly softer than the material of the races of the casing half 42 and which has a low coefficient of friction against the material of the upper casing half 40. This sealing lip 48 projects into an annular recess 50 formed in the outer wall of the casing half 40 and snaps-in behind a locking profile 52 formed at the lower end of the recess 50.

The seal 46 at the internal circumferential edge of the casing 38 is formed by a labyrinth profile 54 and a sealing lip 56 which are both made of the above-mentioned soft synthetic resin material and are molded to the casing half 42. The labyrinth profile 54 and the sealing lip 56 project into an annular recess formed in the upper casing half 40. The sealing lip 56 is in this case not in engagement with the upper casing half 40 but hooks around the internal edge of the upper bearing race 32 and is in sliding engagement with the top surface of this race.

An elastic bias of the sealing lips 48 and 56 enables a good sealing effect is achieved, without the friction forces occurring on the sealing surfaces being strong enough to prevent a smooth rotation of the casing halves 40, 42 relative to one another. When, due to radial forces and deformations of the material, the casing halves 40, 42 become radially offset relative to one another, the resiliency of the sealing lips 48, 56 and, if necessary, also of the labyrinth profile 52, assures that the frictional forces will not increase significantly, so that a smooth rotation of the bearing is still possible.

Figure 3:
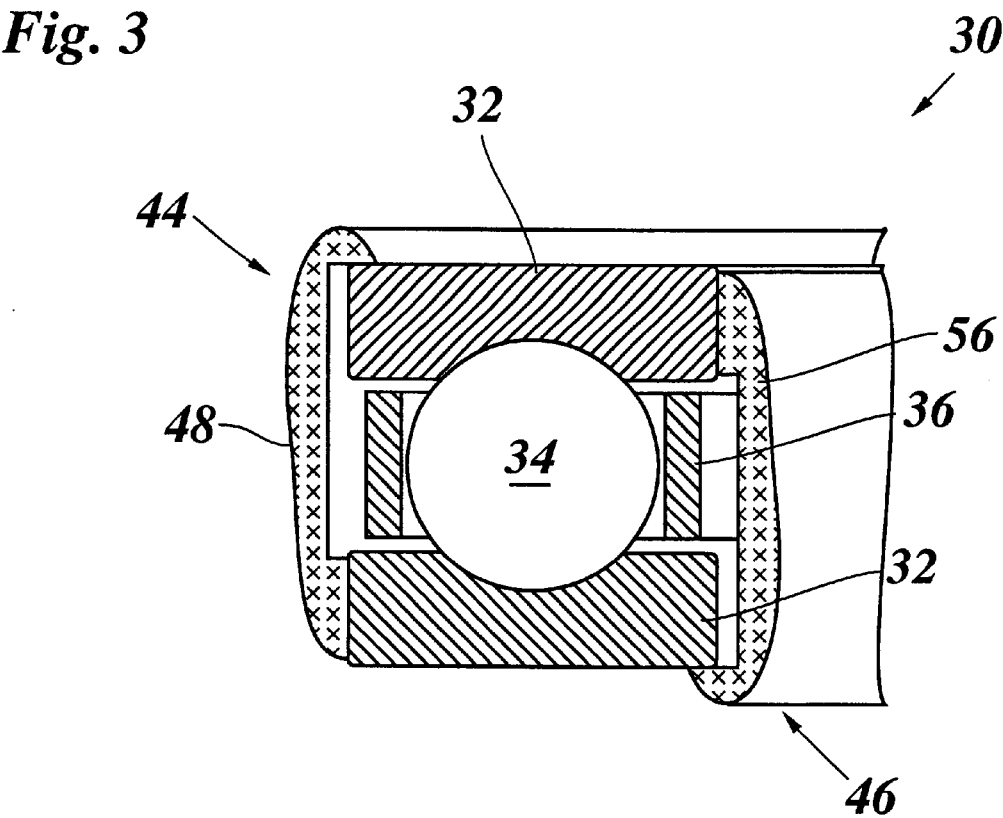
FIG. 3 is a cross section of a strut bearing according to a second embodiment of the invention.

FIG. 3 shows a modified embodiment in which the sealing lips 48 and 56 are each directly molded to an associated one of the bearing races 32 by insert molding, and hook around the respective other bearing race. Alternatively, both sealing lips could also be insert-molded to one and the same bearing race and be in sliding engagement with the other bearing race.

Figure 4:
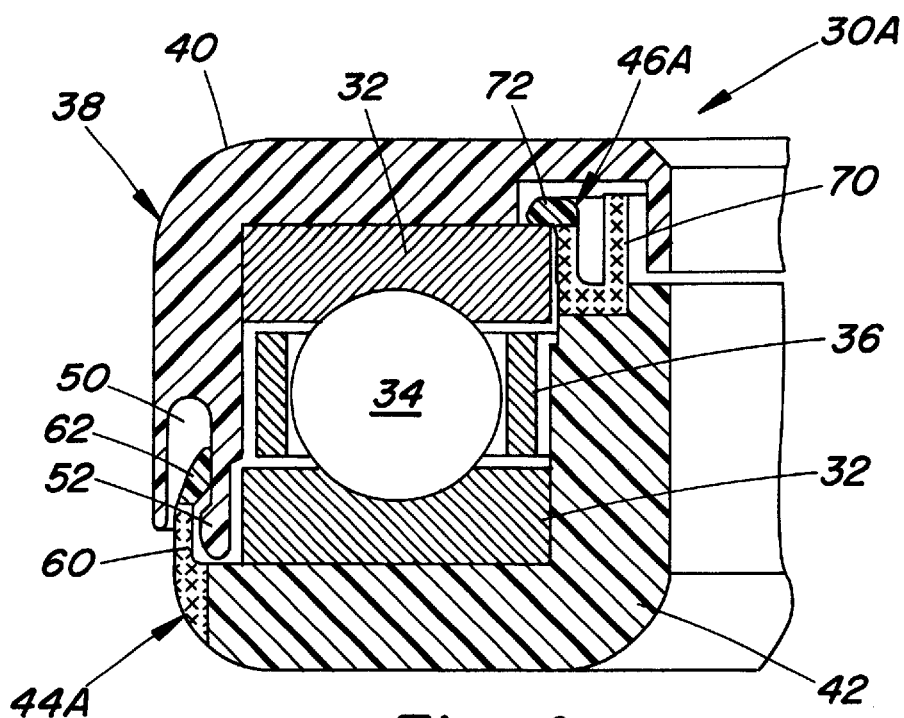
FIG. 4 is a view similar to FIG. 2, depicting a third embodiment of the invention.

Also alternatively, and as explained earlier, only a portion of the seal which connects to the casing (or to the race) would be formed of the soft material, in order to provide the seal with sufficient elasticity. An example of such a bearing 30A is shown in FIG. 4 wherein one end 60 (or 70) of the seal 44A (or 46A) is formed of the soft material and is molded to one casing section, and the other (free) end 62 (or 72) of the seal is formed of a harder material.

Figure 5:
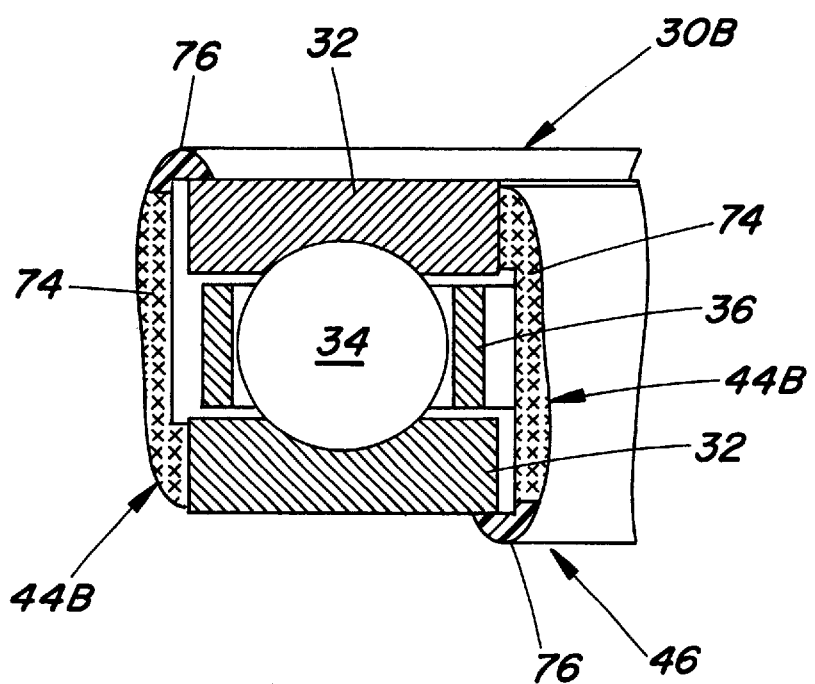
FIG. 5 is a view similar to FIG. 3 depicting a fourth embodiment of the invention.

The same concept can be employed to modify the FIG. 3 bearing, as shown in FIG. 5 wherein a bearing 30B has seals 44B, each of which has one end 74 molded to one race and formed of the soft material, and another end 76 hooked around the other race. The material of the end 76 would be harder than that of the end 74 but not as hard as the race material. Of course, if desired, both seals could be molded to the same race instead of different races.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A strut bearing comprising:
   a casing;
   a race arrangement disposed in said casing and including two bearing races forming a space between one another;
   roll bodies disposed in said space; and
   a seal for sealing said space, at least a portion of said seal comprising an elastic material softer than the material from which said casing is formed, and being molded to said casing.

2. Strut bearing as claimed in claim 1, wherein said seal is, in its entirety, made of said elastic material.

3. Strut bearing as claimed in claim 2, wherein said seal comprises a labyrinth profile.

4. Strut bearing as claimed in claim 1, wherein said casing comprises a pair of casing sections, said seal being molded to one of said casing sections and slidably engaging the other casing section.

5. Strut bearing as claimed in claim 1, wherein said casing comprises a pair of casing sections, said seal being molded to one of said casing sections and slidably engaging one of said bearing races.

6. Strut bearing as claimed in claim 1, wherein said seal comprises a labyrinth profile.

7. Strut bearing according to claim 1 wherein said first seal is molded to one of the casing halves and slidably contacts the other casing half, and the additional seal is molded to one of said casing halves and slidably contacts one of the races.

8. Strut bearing as claimed in claim 1 wherein said casing comprises two sections, said seal forming a snap mechanism for holding said casing sections together.

9. Strut bearing as claimed in claim 1, wherein said casing is composed of two casing halves rotatable relative to one another and forming a first gap at their inner peripheral edge and a second gap and their outer peripheral edge, wherein one of said gaps is closed by said seal, which constitutes a first seal, and the other gap is closed by an additional seal comprising said elastic material.

* * * * *